(12) United States Patent
Shen et al.

(10) Patent No.: US 8,371,716 B2
(45) Date of Patent: Feb. 12, 2013

(54) LINEAR LIGHT-EMITTING MODULE AND TEXTILE PRODUCT HAVING THE SAME

(75) Inventors: Chien-Lung Shen, Taipei Hsien (TW); Pei-Jing Chen, Taipei Hsien (TW); Kun-Chuan Tsai, Taipei Hsien (TW)

(73) Assignee: Taiwan Textile Research Institute, New Taipei (TW)

( * ) Notice: Subject to any disclaimer, the term of this patent is extended or adjusted under 35 U.S.C. 154(b) by 141 days.

(21) Appl. No.: 13/073,962

(22) Filed: Mar. 28, 2011

(65) Prior Publication Data

US 2012/0039070 A1    Feb. 16, 2012

(30) Foreign Application Priority Data

Aug. 13, 2010    (TW) ................................ 99127142 A (51) Int. Cl.
*F21V 21/00*    (2006.01)

(52) U.S. Cl. ......... 362/249.02; 362/249.06; 362/249.16; 362/391; 362/217.01

(58) Field of Classification Search ............. 362/249.01, 362/249.02, 249.06, 249.16, 240, 235, 391
See application file for complete search history.

(56) References Cited

U.S. PATENT DOCUMENTS

| | | | |
|---|---|---|---|
| 6,386,733 B1 * | 5/2002 | Ohkohdo et al. | 362/249.06 |
| 6,840,655 B2 * | 1/2005 | Shen | 362/249.04 |
| 7,140,751 B2 * | 11/2006 | Lin | 362/249.02 |
| 7,201,511 B2 * | 4/2007 | Moriyama et al. | 362/646 |
| 7,273,300 B2 * | 9/2007 | Mrakovich | 362/249.01 |
| 2008/0137332 A1 | 6/2008 | Lo et al. | |

FOREIGN PATENT DOCUMENTS

| | | |
|---|---|---|
| CA | 2630322 | 5/2009 |
| CN | 201121811 | 9/2008 |
| CN | 101360947 | 2/2009 |
| CN | 201265769 | 7/2009 |
| DE | 202008006143 | 7/2008 |
| FR | 2923582 | 5/2009 |
| GB | 2454546 | 5/2009 |
| TW | 356666 | 4/1999 |
| TW | M241439 | 8/2004 |
| TW | I244535 | 12/2005 |
| TW | 200714218 | 4/2007 |
| TW | M341145 | 9/2008 |
| TW | M341805 | 10/2008 |
| TW | 200916620 | 4/2009 |
| TW | M364802 | 9/2009 |

* cited by examiner

*Primary Examiner* — Ali Alavi
(74) *Attorney, Agent, or Firm* — Jianq Chyun IP Office (57) ABSTRACT

A linear light-emitting module including a conducting line, a plurality of LED packages, and a plurality of package colloid is provided. The conducting line includes a pair of conducting wires which are isolated from each other and a light-guiding insulating material. The light-guiding insulating material partially covers the conducting wires so as to expose a plurality of local portions. The LED packages are disposed between the conducting wires, and each of the LED packages is electrically connected to one of the local portions, wherein each LED package has a light-emergence surface, and the light-emergence surface is substantially perpendicular to an extension direction of the corresponding local portion. The package colloid cover the LED packages and the local portions. A textile product having the foregoing linear light-emitting module is also provided.

33 Claims, 6 Drawing Sheets

LINEAR LIGHT-EMITTING MODULE AND TEXTILE PRODUCT HAVING THE SAME

CROSS-REFERENCE TO RELATED APPLICATION

This application claims the priority benefit of Taiwan application serial no. 99127142, filed on Aug. 13, 2010. The entirety of the above-mentioned patent application is hereby incorporated by reference herein and made a part of this specification.

BACKGROUND OF THE INVENTION

1. Field of the Invention

The invention is related to a linear light-emitting module, and in particular to a textile product having a linear light-emitting module.

2. Description of Related Art

As the world economy is globalized at a faster rate, the textile industry is facing strong competition, forcing it to make changes and constantly enhance textile technology and develop products of high value. In recent years, due to the boom of the optoelectronic industry, some optoelectronic devices (such as light-emitting diodes (LED)) are gradually used in fabrics, so that these fabrics have functions of light emission or even display. Currently, many designs of light-emitting fabrics are provided one after another, such as those described in Taiwanese patent application publication number 200916620, Taiwanese patent number TWM341145, TWM364802, TWI244535, and TW356666. However, in the light-emitting fabrics provided in these prior art, light sources carried thereon usually have directional limits, and connections between conducting lines and light sources are more conspicuous, so that the light-emitting fabrics in the prior art have inferior light uniformity. Moreover, since the light sources in the light-emitting fabrics are often point light sources, and displayed colors are usually colors of the light sources, the conventional light-emitting fabrics are only able to display more monotonic colored light and require much improvement.

SUMMARY OF THE INVENTION

The disclosure provides a linear light-emitting module which is able to emit light after supplied with electricity.

The disclosure also provides a textile product which includes the above linear light-emitting module.

The disclosure provides a linear light-emitting module, which includes a conducting line, a plurality of LED packages, and a plurality of package colloid. The conducting line includes a pair of conducting wires which are isolated from each other and a light-guiding isolating material. The light-guiding isolating material partially covers the conducting wires which are isolated from each other, so as to expose a plurality of local portions of the conducting wires which are isolated from each other. The LED packages are disposed between the conducting wires which are isolated from each other, and each of the LED packages is electrically connected to one of the local portions. Each of the LED packages comprises a light-emergence surface, and each of the light-emergence surfaces is substantially perpendicular to an extension direction of the corresponding local portion. The package colloid cover the LED packages and the local portions.

The disclosure also provides a textile product, which includes a main body and at least one of the above linear light-emitting module, and the light-emitting module is disposed on the main body.

According to an embodiment of the disclosure, the light-guiding insulating material includes a colorless transparent insulating material or a colored transparent insulating material.

According to an embodiment of the disclosure, the above conducting wires which are isolated from each other are flexible conducting wires, and the light-guiding insulating material is a flexible light-guiding insulating material.

According to an embodiment of the disclosure, the light-guiding insulating material includes a plurality of light-guiding insulating sheaths, covering portions of the conducting wires other than the local portions.

According to an embodiment of the disclosure, the above package colloid further cover terminals of each of the light-guiding insulating sheaths.

According to an embodiment of the disclosure, each of the LED packages has a first electrode and a second electrode, and the conducting wires which are isolated from each other include a first conducting wire and a second conducting wire. In each of the LED packages, the first electrode is electrically connected to the first conducting wire, and the second electrode is electrically connected to the second conducting wire.

According to an embodiment of the disclosure, a lateral dimension of each of the LED packages is less than a lateral thread diameter of the conducting line, and a vertical dimension of each of the LED packages is less than a vertical thread diameter of the conducting line.

According to an embodiment of the disclosure, the vertical dimension of each of the LED packages is H, the vertical thread diameter of the conducting line is H', and H≦0.8×H'.

According to an embodiment of the disclosure, the lateral dimension of each of the LED packages is L, a gap between the conducting wires which are isolated from each other is D, and D≦L≦1.2×D.

According to an embodiment of the disclosure, a lateral dimension of each of the package colloid is substantially equal to the lateral thread diameter of the conducting line, and a vertical dimension of each of the package colloid is substantially equal to the vertical thread diameter of the conducting line.

According to an embodiment of the disclosure, distances between the LED packages are 15-25 mm.

According to an embodiment of the disclosure, distances between the LED packages are 20 mm.

According to an embodiment of the disclosure, the package colloid include colorless transparent package colloid or colored transparent package colloid.

According to an embodiment of the disclosure, the linear light-emitting module further includes a structure-reinforcing textile, covering the conducting line and the package colloid.

According to an embodiment of the invention, the structure-reinforcing textile includes a white textile or a colored textile.

According to an embodiment of the disclosure, the structure-reinforcing textile includes a sheath and at least a sewn part, wherein the sheath covers the conducting line and the package colloid. The sewn part extends from the sheath.

According to an embodiment of the disclosure, the above main body includes garments, backpacks, handbags, accessories, hats, necklaces, belts, safety warning signs, and medical supplies.

In the disclosure, the LED packages and the conducting line are integrated to form the linear light-emitting module, so that the linear light-emitting module and the textile product provided by the disclosure emit uniform light of different colors after being properly driven.

In order to make the aforementioned and other objects, features and advantages of the disclosure comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
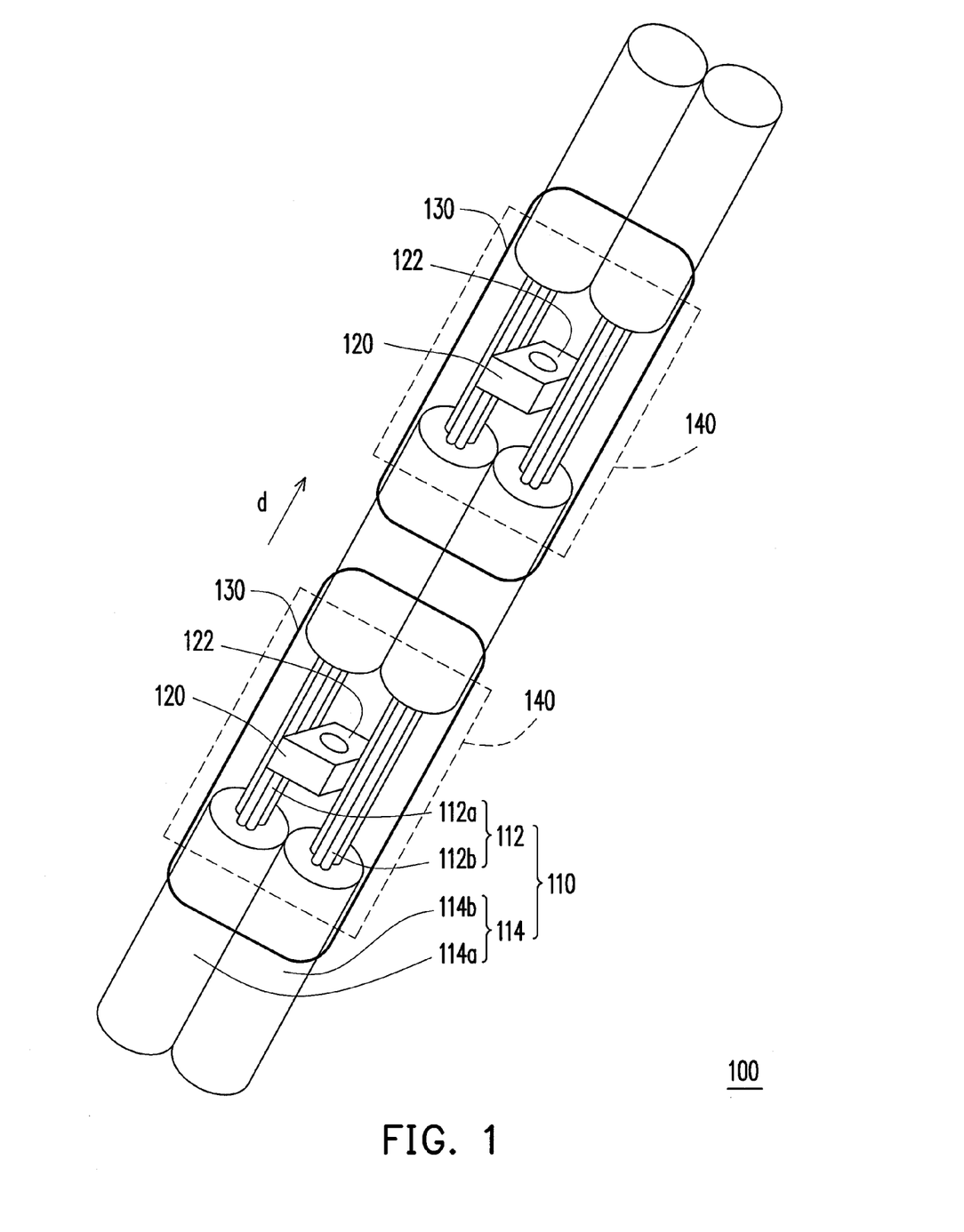
FIG. 1 is a schematic view of a linear light-emitting module according to an embodiment of the disclosure.

FIG. 1 is a schematic view of a linear light-emitting module according to an embodiment of the disclosure. Referring to FIG. 1, a linear light-emitting module 100 according to the present embodiment includes a conducting line 110, a plurality of LED packages 120, and a plurality of package colloid 130.

According to the present embodiment, the conducting line 110 includes, for example, a pair of conducting wires 112a and 112b which are isolated from each other and a light-guiding insulating material 114. The light-guiding insulating material 114 includes a plurality of (two or more) light-guiding insulating sheaths 114a and 114b which partially cover the conducting wires which are isolated from each other, so as to expose a plurality of local portions 140 of the conducting wires 112 that are isolated from each other.

It should be noted that for ease of description, FIG. 1 only shows two LED packages 120 and two exposed local portions 140, and distances between the LED packages 120 according to the present embodiment are 15-25 mm. The disclosure, however, is not limited to the above configuration.

According to the present embodiment, the LED packages 120 are disposed between the conducting wires which are isolated from each other, and each of the LED packages 120 is electrically connected to one of the local portions 140. Each of the LED packages 120 has a light-emergence surface 122, which is substantially perpendicular to an extension direction d of the corresponding local portion 140. The package colloid 130 cover the LED packages 120, the local portions 140, and terminals of each of the light-guiding insulating sheaths.

Due to the fact that the light-emergence surface 122 of each of the LED packages 120 is substantially perpendicular to the extension direction d of the corresponding local portion 140, the linear light-emitting module 100 is able to emit colored light with good uniformity when appropriately driven.

According to the present embodiment, in order to make colored light output by the LED packages 120 perceivable by the user, the light-guiding insulating material 114 is, for example, a colorless transparent insulating material. Therefore, the LED packages 120 and the conducting line 110 are able to form linear light-emitting modules of different colors according to the colored lights emitted by the LEDs.

It should be noted that the material of the light-guiding insulating material is not limited to the colorless transparent insulating material. In the present embodiment, by selecting a color of the light-guiding insulating material, colors of light emitted from the light-guiding insulating material are altered, so that the linear light-emitting module 100 displays a greater variety of colors. The light-guiding insulating material is, for example, a colored transparent insulating material, and the user is able to adjust a color of the linear light-emitting module according to design requirements. For example, if it is desirable for the linear light-emitting module to emit purple light, a red LED package 120 may be disposed between the conducting wires 112 isolated from each other, and a blue transparent insulating material may be used in conjunction, so as to form a purple linear light-emitting module.

In addition, in order to cooperate with the colored light of the LEE) and the light-guiding insulating material, the package colloid 130 according to the present embodiment are, for example, colorless transparent package colloid or colored transparent package colloid. A color thereof may be the same as or different from the colored light of the LED and the light-guiding insulating material.

In order to increase the variety of colors displayed by the linear light-emitting module 100, according to the present embodiment, the LED packages 120 which are capable of emitting light of the same color may be integrated in the linear light-emitting module 100. The LED packages 120 which are capable of emitting light of different colors may also integrated in the linear light-emitting module 100. In other words, the disclosure does not limit that the LED packages 120 in the same linear light-emitting module 100 have to emit light of the same color.

Also, in order to increase the number of possible applications of the linear light-emitting module, the conducting wires isolated from each other according to the present embodiment are, for example, flexible conducting wires, and the light-guiding insulating material is a flexible light-guiding insulating material.

Therefore, the linear light-emitting module according to the present embodiment has a wide range of applications, including LED linear lamps, LED threads, LED polyvinyl chloride lamps, electroluminescent light-emitting strips, LED light bulb copper wire lamps, LED adhesive light strips, LED self-luminance polyurethane soft batten lamps, LED wire lamps, LED batten lamps, LED optical fibers or electroluminescent light emission.

Generally, in actual application, the greatest processing range of the LED packages in the linear light-emitting module is 15-100 mm, and according to textile processing requirements, the distances between the LED packages may be variable. For example, one of the LED packages in the linear light-emitting module may be separated from a previous LED package by 15 mm, and from a next LED package by 30 mm. In other words, the distances between the LED packages in the linear light-emitting module are not necessarily the same.

According to the present embodiment, in order to conform to requirements of light uniformity, the distances between the LED packages may be 20 mm, and a processing range is 15-25 mm. The disclosure, however, is not limited to the above configuration.

Figure 2A:
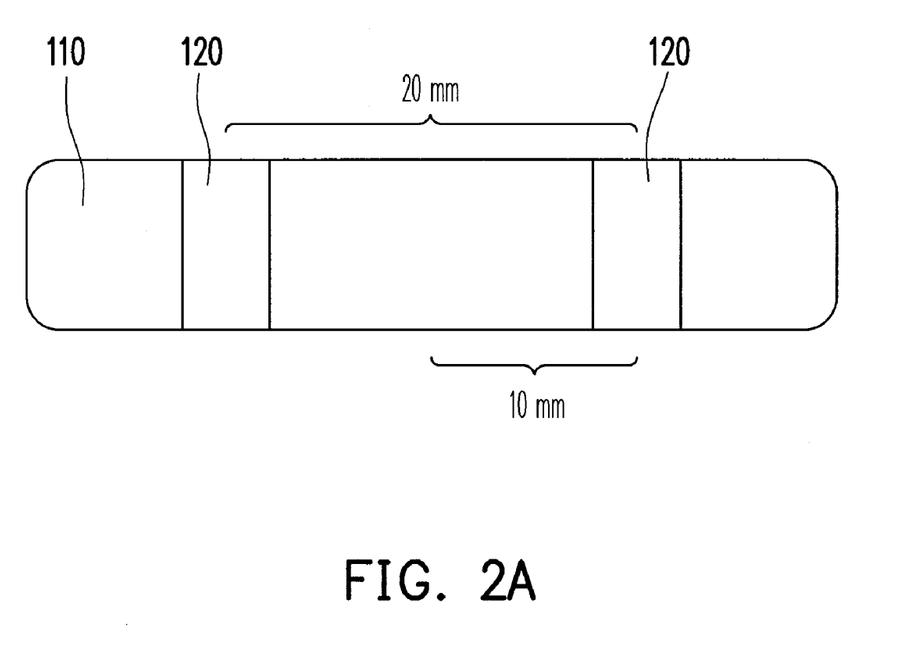
FIG. 2A shows that distances between LED packages are 20 mm.

Therefore, the distances between the LED packages 120 according to the present embodiment are 15-25 mm. For example, FIG. 2A shows that the distances between the LED packages 120 are 20 mm. When the light emitted by the LED packages is substantially parallel to the extension direction d of the linear light-emitting module, there is still a significant amount of light at a distance of 10 mm away from the LED packages, meaning that the linear light-emitting module 100 has good light uniformity and optical quality.

Figure 2B:
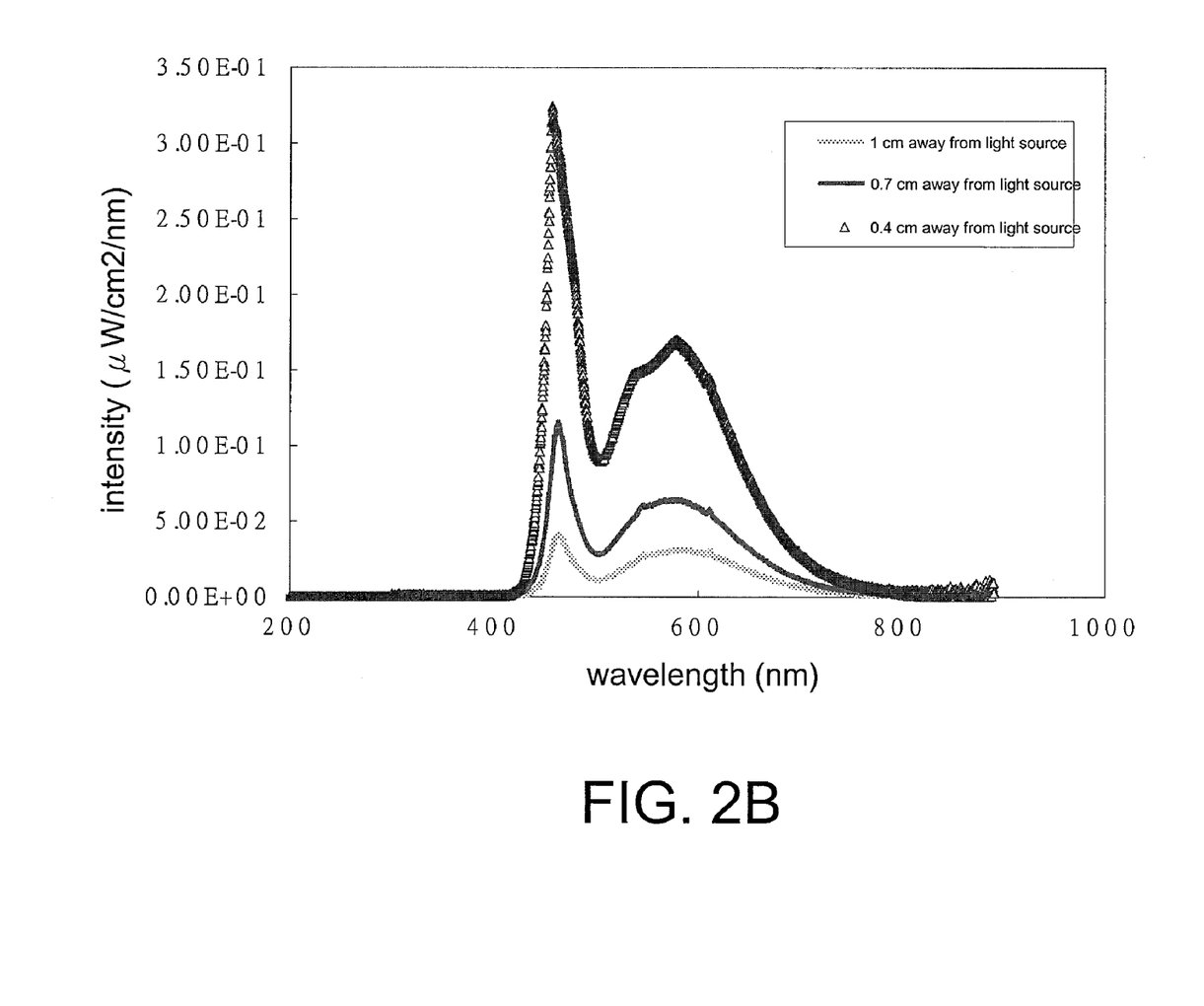
FIG. 2B shows light intensity measured at different distances away from the LED packages in the linear light-emitting module.

FIG. 2B shows light intensity measured at different distances away from the LED packages in the linear light-emitting module. According to FIG. 2B, as the distance from the LED packages increases, the intensity of light decreases, showing that the linear light-emitting module in the present embodiment has a light-guiding effect.

Figure 3:
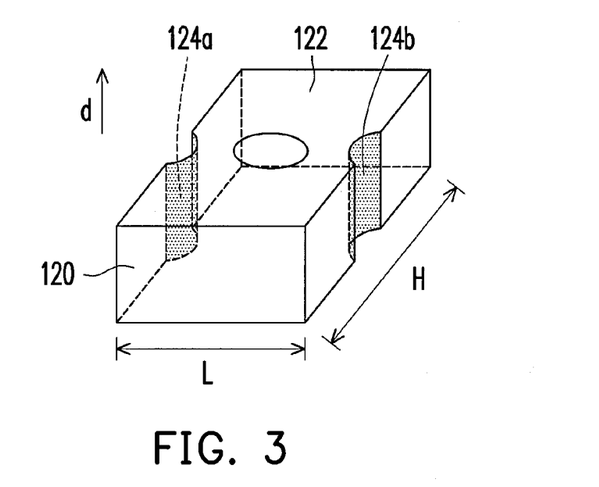
FIG. 3 is a schematic view of an LED package according to an embodiment of the disclosure.

FIG. 3 is a schematic view of an LED package according to an embodiment of the disclosure. Referring to FIG. 3, the LED package 120 in the present embodiment has a first electrode 124a and a second electrode 124b, and the conducting wires which are isolated from each other include a first conducting wire 112a and a second conducting wire 112b. In each of the LED packages 120, the first electrode 124a is electrically connected to the first conducting wire 112a, and the second electrode 124b is electrically connected to the second conducting wire 112b. When the first conducting wire 112a is electrically coupled to a high voltage, and the second conducting wire 112b is electrically coupled to a low voltage, the first electrode 124a is defined as an anode, and the second electrode 124b is defined as a cathode.

It should be noted that, according to embodiments of the disclosure, the conducting wires 112 which are isolated from each other are not limited to using a direct current bias voltage; according to design requirements, an alternating current power source may also be used. In other words, the linear light-emitting module 100 is capable of using a direct current or alternating current power source.

According to an embodiment of the disclosure, welding or another method is used to provide for electrical connection between the first conducting wire 112a and the first electrode 124a and between the second conducting wire 112b and the second electrode 124b.

Moreover, in FIG. 3, each of the LED packages has a lateral dimension L and a vertical dimension H.

Figure 4A:
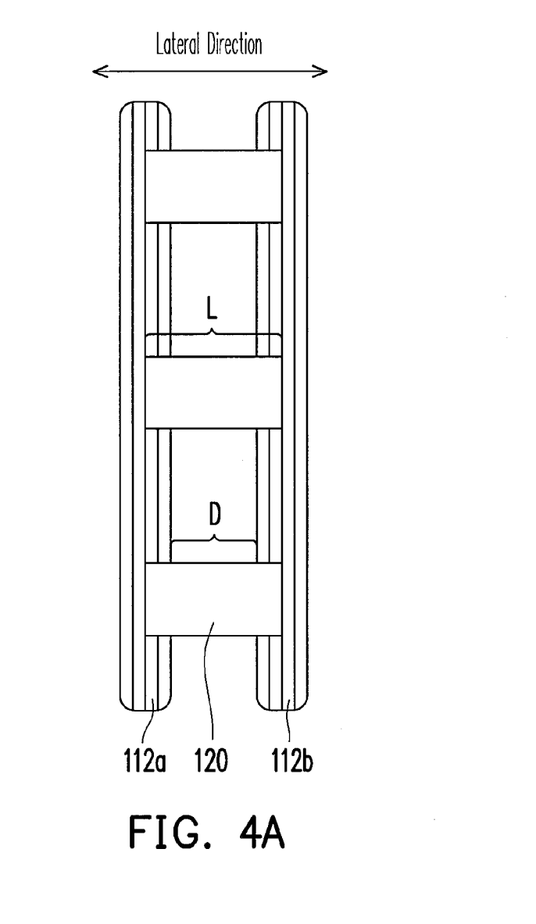
FIG. 4A is a schematic top view of the linear light-emitting module in FIG. 1.
Figure 4B:
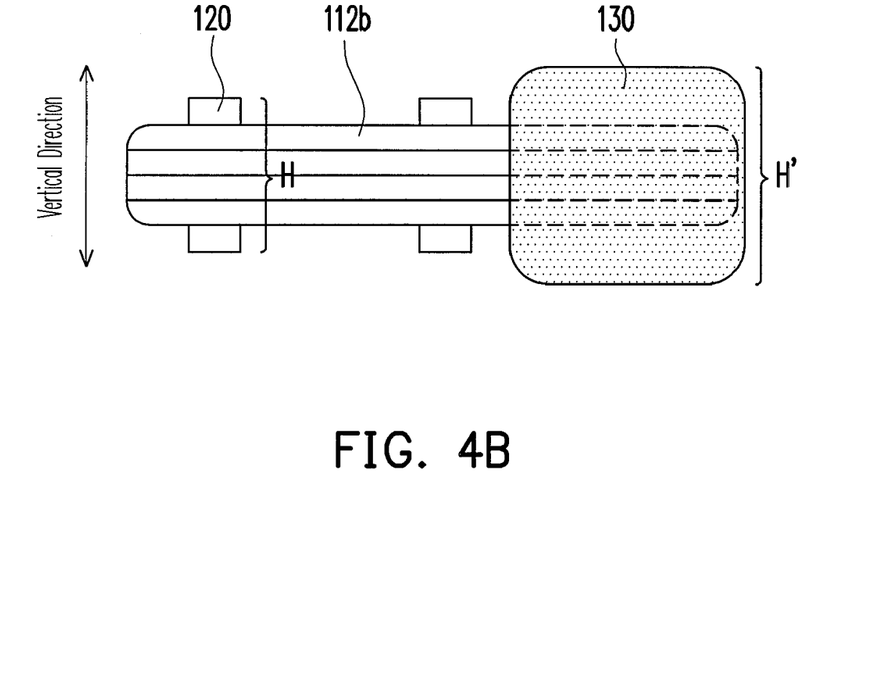
FIG. 4B is a schematic side view of the linear light-emitting module in FIG. 1.

FIG. 4A is a schematic top view of the linear light-emitting module in FIG. 1, and FIG. 4B is a schematic side view of the linear light-emitting module in FIG. 1. Please refer to FIGS. 1 to 4B. According to FIGS. 4A and 4B, the lateral dimension L of the LED package 120 is less than a lateral thread diameter of the conducting line, and the vertical dimension H of the LED package is less than a vertical thread diameter of the conducting line.

In detail, according to FIG. 4A, from a lateral point of view, the LED package has the lateral dimension L, and a gap between the conducting wires which are isolated from each other is D. According to the present embodiment, $D \leq L \leq 1.2 \times D$. In other words, the lateral dimension L of the LED package 120 is less than the lateral thread diameter (for example, $1.2 \times D$) of the conducting line. It should be noted that in order to clearly represent the relationship between the lateral dimension L and the gap D, the package colloid 130 of the linear light-emitting module 100 are not shown in FIG. 4A.

From a vertical point of view, according to FIG. 4B, the LED package has the vertical dimension H, and a vertical thread diameter of the electrical line is H'. According to the present embodiment, $H \leq 0.8 \times H'$. In other words, the vertical dimension H of the LED packages is less than the vertical thread diameter (for example, H') of the conducting line.

Therefore, according to the present embodiment, the LED packages 120 have dimensions that are able to fit in a space constructed by the conducting line 110.

Furthermore, according to the linear light-emitting module 100 shown in FIG. 1, a lateral dimension of each of the package colloid 130 in the present embodiment is substantially equal to the lateral thread diameter of the conducting line 110, and a vertical dimension of each of the package colloid 130 is substantially equal to the vertical thread diameter of the conducting line 110.

Figure 5A:
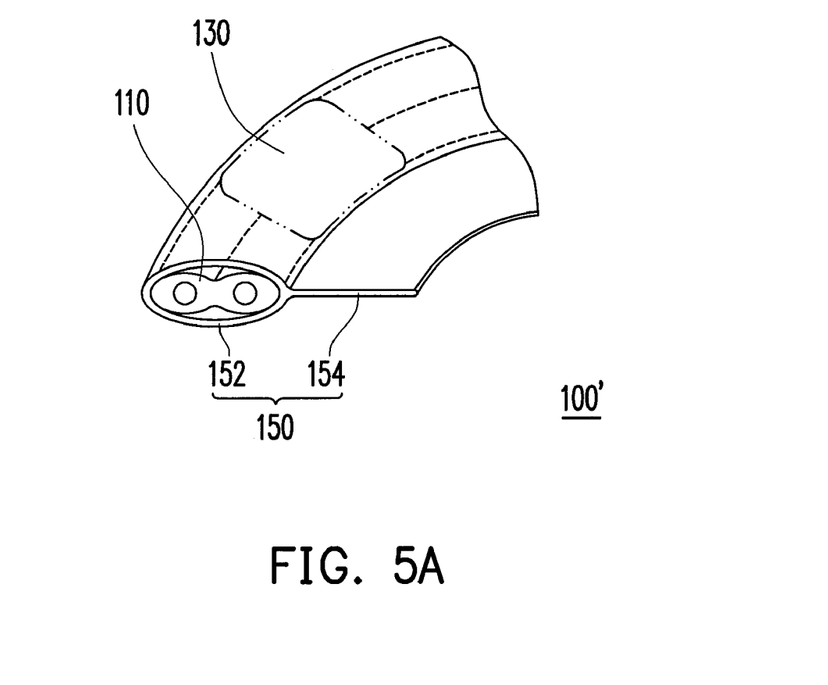
FIGS. 5A and 5B are schematic views of a linear light-emitting module according to another embodiment of the disclosure.
Figure 5B:
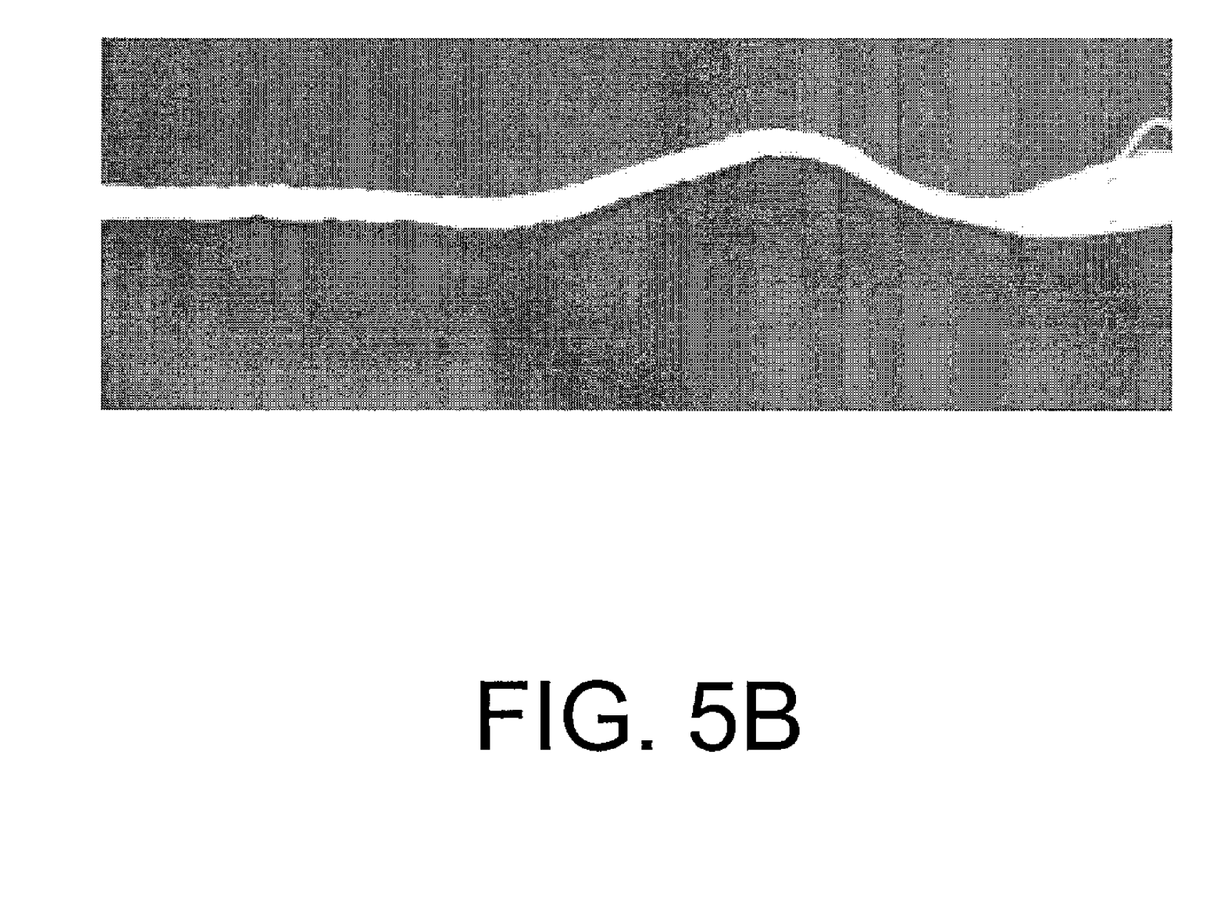

FIGS. 5A and 5B are schematic views of a linear light-emitting module according to another embodiment of the disclosure. Please refer to FIG. 5A. A main difference between a linear light-emitting module 100' in the present embodiment and the linear light-emitting module 100 in FIG. 1 lies in that the linear light-emitting module 100' further includes a structure-reinforcing textile 150 which covers the conducting line 110 and the package colloid 130.

In detail, according to the present embodiment, the structure-reinforcing textile 150 includes a sheath 152 and at least one sewn part 154. The sheath 152 covers the conducting line 110 and the package colloid 130. The sewn part 154 extends from the sheath 152. In addition, the structure-reinforcing textile 150 is, for example, a white textile or a colored textile. In the present embodiment, by selecting a color of the structure-reinforcing textile, there is greater variety in the colors displayed by the linear light-emitting module, thereby increasing the number of possible applications thereof.

According to embodiments of the disclosure, through weaving and covering the conducting line and the package colloid with the structure-reinforcing textile, the strength and anti-abrasiveness of the linear light-emitting module are enhanced. For example, after the linear light-emitting module is covered by fabric, the tensile strength thereof increases from 4.5 kgf to 35 kgf, a seven-fold increase. Moreover, after the linear light-emitting module is covered by fabric, the anti-abrasiveness thereof is lowered by 27%, thereby conforming to thread-processing standards.

Therefore, after the linear light-emitting module is covered by fabric, the linear light-emitting module includes a budding thread and is sewable, and also includes a weaving and covering structure, thereby enhancing the strength and anti-abrasiveness of the linear light-emitting module. The linear light-emitting module also includes a multi-color thread-forming structure.

It should be noted that in the disclosure, by using a method of textile processing, the structure-reinforcing textile covers the linear light-emitting module to form a one-dimensional light-emitting module. The disclosure, however, is not limited to the above configuration. According to the disclosure, through a method of textile processing, the structure-reinforcing textile may be weaved into a two-dimensional complex thread, so as to form a two-dimensional light-emitting cloth through combination with the linear light-emitting module.

In addition, since the conducting line and the package colloid have waterproof designs, both the one-dimensional light-emitting module and the two-dimensional light-emitting cloth are able to be washed multiple times with water and still retain superb light-emitting intensity.

Moreover, the linear light-emitting module in the disclosure may be disposed on different main bodies to form different textile products. The above main bodies include, for example, garments, backpacks, handbags, accessories, hats, necklaces, belts, safety warning signs, and medical supplies.

Therefore, the linear light-emitting module in the disclosure may be widely applied in different aspects to form textile products with a wide range of variety, such as glowing dresses, mountain-climbing outfits, fashion bags, light-emitting weaved belts, light-emitting weaved bags, fashion cloth lamps, fashion leg binders, or light-emitting pet garments.

In the disclosure, the LED packages are disposed between the conducting wires which are isolated from each other, and the light-emergence surface of each of the LED packages is substantially perpendicular to the extension direction of the corresponding local portions, so that the linear light-emitting module emits colored light of high uniformity. Therefore, the linear light-emitting module in the disclosure provides light that is uniform and having a great variety of colors. Furthermore, after the linear light-emitting module is covered by thread, the linear light-emitting module has a stronger tensile strength and greater anti-abrasiveness.

It will be apparent to those skilled in the art that various modifications and variations can be made to the disclosure without departing from the scope or spirit of the disclosure. In view of the foregoing, it is intended that the disclosure cover modifications and variations provided they fall within the scope of the following claims and their equivalents.

What is claimed is:

1. A linear light-emitting module, comprising:
   a conducting line, comprising:
      a pair of conducting wires isolated from each other; and
      a light-guiding insulating material, partially covering the pair of conducting wires, so as to expose a plurality of local portions of the pair of conducting wires;
   a plurality of light-emitting diode (LED) packages, disposed between the pair of conducting wires, each of the LED packages being electrically connected to one of the local portions respectively, wherein each of the LED packages comprises a light-emergence surface, and the light-emergence surface is substantially perpendicular to an extension direction of the corresponding local portion; and
   a plurality of package colloid, covering the LED packages and the plurality of local portions.

2. The linear light-emitting module as claimed in claim 1, wherein the light-guiding insulating material comprises a colorless transparent insulating material or a colored transparent insulating material.

3. The linear light-emitting module as claimed in claim 1, wherein the pair of conducting wires are flexible conducting wires, and the light-guiding insulating material is a flexible light-guiding insulating material.

4. The linear light-emitting module as claimed in claim 1, wherein the light-guiding insulating material comprises a plurality of light-guiding insulating sheaths, covering portions of the conducting wires other than the local portions.

5. The linear light-emitting module as claimed in claim 4, wherein the package colloid further covers terminals of each of the light-guiding insulating sheaths.

6. The linear light-emitting module as claimed in claim 1, wherein each of the LED packages comprises a first electrode and a second electrode, and the pair of conducting wires comprise a first conducting wire and a second conducting wire, the first electrode of each of the LED packages is electrically connected to the first conducting wire, and the second electrode of each of the LED packages is electrically connected to the second conducting wire.

7. The linear light-emitting module as claimed in claim 1, wherein a lateral dimension of each of the LED packages is less than a lateral thread diameter of the conducting line, and a vertical dimension of each of the LED packages is less than a vertical thread diameter of the conducting line.

8. The linear light-emitting module as claimed in claim 7, wherein the vertical dimension of each of the LED packages is H, the vertical thread diameter of the conducting line is H', and $H \leqq 0.8 \times H'$.

9. The linear light-emitting module as claimed in claim 1, wherein the lateral dimension of each of the LED packages is L, a gap between the pair of conducting wires is D, and $D \leqq L \leqq 1.2 \times D$.

10. The linear light-emitting module as claimed in claim 1, wherein a lateral dimension of each of the package colloid is substantially equal to a lateral thread diameter of the conducting line, and a vertical dimension of each of the package colloid is substantially equal to a vertical thread diameter of the conducting line.

11. The linear light-emitting module as claimed in claim 1, wherein distances between the LED packages are 15-25 mm.

12. The linear light-emitting module as claimed in claim 11, wherein the distances between the LED packages are 20 mm.

13. The linear light-emitting module as claimed in claim 1, wherein the package colloid comprises a colorless transparent package colloid or a colored transparent package colloid.

14. The linear light-emitting module as claimed in claim 1, further comprising a structure-reinforcing textile, covering the conducting line and the package colloid.

15. The linear light-emitting module as claimed in claim 14, wherein the structure-reinforcing textile comprises a white textile or a colored textile.

16. The linear light-emitting module as claimed in claim 14, wherein the structure-reinforcing textile comprises:
   a sheath, covering the conducting line and the package colloid; and
   at least one sewn part, extending from the sheath.

17. A textile product, comprising:
   a main body; and
   at least one linear light-emitting module as claimed in claim 1, disposed on the main body.

18. The textile product as claimed in claim 17, wherein the main body comprises garments, backpacks, handbags, accessories, hats, necklaces, belts, safety warning signs, and medical supplies.

19. The textile product as claimed in claim 17, wherein the light-guiding insulating material comprises a colorless transparent insulating material or a colored transparent insulating material.

20. The textile product as claimed in claim 17, wherein the pair of conducting wires are flexible conducting wires, and the light-guiding insulating material is a flexible light-guiding insulating material.

21. The textile product as claimed in claim 17, wherein the light-guiding insulating material comprises a plurality of light-guiding insulating sheaths, covering portions of the conducting wires other than the local portions.

22. The textile product as claimed in claim 21, wherein the package colloid further covers terminals of each of the light-guiding insulating sheaths.

23. The textile product as claimed in claim 17, wherein each of the LED packages comprises a first electrode and a second electrode, and the pair of conducting wires comprise a first conducting wire and a second conducting wire, the first electrode of each of the LED packages is electrically connected to the first conducting wire, and the second electrode of each of the LED packages is electrically connected to the second conducting wire.

24. The textile product as claimed in claim 17, wherein a lateral dimension of each of the LED packages is less than a lateral thread diameter of the conducting line, and a vertical dimension of each of the LED packages is less than a vertical thread diameter of the conducting line.

25. The textile product as claimed in claim 24, wherein the vertical dimension of each of the LED packages is H, the vertical thread diameter of the conducting line is H', and H≦0.8×H'.

26. The textile product as claimed in claim 17, wherein the lateral dimension of each of the LED packages is L, a gap between the pair of conducting wires is D, and D≦L≦1.2×D.

27. The textile product as claimed in claim 17, wherein a lateral dimension of each of the package colloid is substantially equal to a lateral thread diameter of the conducting line, and a vertical dimension of each of the package colloid is substantially equal to a vertical thread diameter of the conducting line.

28. The textile product as claimed in claim 17, wherein distances between the LED packages are 15-25 mm.

29. The textile product as claimed in claim 28, wherein the distances between the LED packages are 20 mm.

30. The textile product as claimed in claim 17, wherein the package colloid comprises a colorless transparent package colloid or a colored transparent package colloid.

31. The textile product as claimed in claim 17, further comprising a structure-reinforcing textile, covering the conducting line and the package colloid.

32. The textile product as claimed in claim 31, wherein the structure-reinforcing textile comprises a white textile or a colored textile.

33. The textile product as claimed in claim 31, wherein the structure-reinforcing textile comprises:
   a sheath, covering the conducting line and the package colloid; and
   at least one sewn part, extending from the sheath.

* * * * *